(12) United States Patent
Kirk et al.

(10) Patent No.: US 6,628,290 B1
(45) Date of Patent: Sep. 30, 2003

(54) GRAPHICS PIPELINE SELECTIVELY PROVIDING MULTIPLE PIXELS OR MULTIPLE TEXTURES

(75) Inventors: David B. Kirk, San Francisco, CA (US); Gopal Solanki, San Jose, CA (US); Curtis Priem, Fremont, CA (US); Walter Donovan, Milpitas, CA (US); Joe L. Yeun, San Jose, CA (US)

(73) Assignee: nVidia Corporation, Santa Clara, CA (US)

( * ) Notice: Subject to any disclaimer, the term of this patent is extended or adjusted under 35 U.S.C. 154(b) by 0 days.

(21) Appl. No.: 09/677,941

(22) Filed: Oct. 2, 2000

Related U.S. Application Data

(62) Division of application No. 09/273,826, filed on Mar. 22, 1999, now Pat. No. 6,181,352.

(51) Int. Cl.[7] .............. G06T 1/20; G06T 11/40
(52) U.S. Cl. ............. 345/506; 345/582; 345/561
(58) Field of Search .............. 345/419, 582, 345/589, 606, 501–503, 506, 552, 561

(56) References Cited

U.S. PATENT DOCUMENTS

| | | | |
|---|---|---|---|
| 4,586,038 A | 4/1986 | Sims et al. | 340/729 |
| 4,692,880 A | 9/1987 | Merz et al. | 364/521 |
| 4,727,365 A | 2/1988 | Bunker et al. | 340/728 |
| 4,866,637 A | 9/1989 | Gonzalez-Lopez et al. | 364/518 |
| 5,185,856 A | 2/1993 | Alcorn et al. | 395/130 |
| 5,222,205 A | 6/1993 | Larson et al. | 395/130 |
| 5,255,360 A | 10/1993 | Peaslee et al. | 395/162 |
| 5,369,736 A | 11/1994 | Kato et al. | 395/125 |
| 5,371,896 A | 12/1994 | Gove et al. | 395/800 |
| 5,469,535 A | 11/1995 | Jarvis et al. | 395/130 |
| 5,471,592 A | 11/1995 | Gove et al. | 395/300.03 |
| 5,504,845 A | 4/1996 | Vecchione | 395/119 |

(List continued on next page.)

FOREIGN PATENT DOCUMENTS

| | | | |
|---|---|---|---|
| EP | 0 438 194 A3 | 7/1991 | G06F/15/72 |
| EP | 0 438 194 A2 | 7/1991 | G06F/15/72 |

OTHER PUBLICATIONS

"Bacon's Stop Press: Voodo 3," *Next Generation Magazine*, Brisbane, California, Jan. 1999, one page.

Chronis, George T., "Technobabble Screamin' Like a Banshee," *PC Games*, Apr. 1999, pp. 106–107.

"The Voodoo Architecture Advantage, Graphics Performance and Image Quality, Revision 1.2," Feb. 5, 1999, Copyright 1998 3Dfx Interactive, Inc.

Shimpi, Anand Lal, "3dfx Voodoo 3," Apr. 3, 1999, pp. 1–8, download frm Internet (http://anandtech.com/html/article display.cfm?document=923).

(List continued on next page.)

*Primary Examiner*—Ulka J. Chauhan
(74) *Attorney, Agent, or Firm*—Moser, Patterson & Sheridan, LLP.

(57) ABSTRACT

A method and graphics accelerator apparatus for pipelined generation of output values for a sequence of pixels, with generation of output values for each of at least two textured pixels during each pipeline clock interval. The apparatus includes a combiner stage capable of producing output values during each clock interval of the pipeline, wherein the output values are indicative of a blend of a plurality of textures with a single pixel when the combiner stage operates in a first mode, and the output values are indicative of a blend of an individual texture with two pixels when the combiner stage operates in a second mode.

3 Claims, 5 Drawing Sheets

U.S. PATENT DOCUMENTS

| | | | | |
|---|---|---|---|---|
| 5,586,234 | A | 12/1996 | Sakuraba et al. | 395/130 |
| 5,594,854 | A | 1/1997 | Baldwin et al. | 395/141 |
| 5,720,019 | A | 2/1998 | Koss et al. | 395/134 |
| 5,740,343 | A | 4/1998 | Tarolli et al. | 395/130 |
| 5,742,796 | A | 4/1998 | Huxley | 395/502 |
| 5,745,118 | A | 4/1998 | Alcorn et al. | 345/430 |
| 5,764,243 | A | 6/1998 | Baldwin | 345/506 |
| 5,767,856 | A | 6/1998 | Peterson et al. | 345/422 |
| 5,777,629 | A | 7/1998 | Baldwin | 345/506 |
| 5,798,770 | A | 8/1998 | Baldwin | 345/506 |
| 5,815,166 | A | 9/1998 | Baldwin | 345/506 |
| 5,831,623 | A | 11/1998 | Negishi et al. | 345/424 |
| 5,831,624 | A | 11/1998 | Tarolli et al. | 345/430 |
| 5,844,576 | A | 12/1998 | Wilde et al. | 345/525 |
| 5,847,717 | A | 12/1998 | Berry | 345/506 |
| 5,870,102 | A * | 2/1999 | Tarolli et al. | 345/430 |
| 5,877,770 | A | 3/1999 | Hanaoka | 345/430 |
| 5,877,779 | A | 3/1999 | Goldberg et al. | 345/511 |
| 5,886,706 | A | 3/1999 | Alcorn et al. | 345/430 |
| 5,949,426 | A | 9/1999 | Rich | 345/430 |
| 5,977,977 | A * | 11/1999 | Kajiya et al. | 345/418 |
| 5,977,982 | A | 11/1999 | Lauzon | 345/430 |
| 5,987,567 | A | 11/1999 | Rivard et al. | 711/118 |
| 6,005,584 | A | 12/1999 | Kitamura et al. | 345/430 |
| 6,011,565 | A | 1/2000 | Kuo et al. | 345/513 |
| 6,016,151 | A * | 1/2000 | Lin | 345/430 |
| 6,222,550 | B1 * | 4/2001 | Rosman et al. | 345/419 |
| 6,239,810 | B1 * | 5/2001 | Van Hook et al. | 345/431 |
| 6,259,460 | B1 * | 7/2001 | Gossett et al. | 345/552 |

OTHER PUBLICATIONS

Shaw, et al., A VLSI Architecture for Image Composition, in *Advances in Computer Graphics Hardware III*, A.A.M. Kuijk (Ed.), pp. 183–199 (1991).

Aono, et al., A 30 NS (600 MOPS) Image Processor with a Reconfigurable Pipeline Architecture, *IEEE 1989 Custom Integrated Circuits Conference*, pp. 24.4.1–24.4.4 (1989).

Texas Instruments TMS320C80 (MVP) User's Guide (Mar. 1995).

Molnar, Steven, Combining Z–buffer Engines for Higher–Speed Rendering, in *Advances in Computer Graphics Hardware III*, A.A.M. Kuijk (Ed.), pp. 171–182 (1991).

* cited by examiner

GRAPHICS PIPELINE SELECTIVELY PROVIDING MULTIPLE PIXELS OR MULTIPLE TEXTURES

This is a divisional of U.S. application Ser. No. 09/273,826, filed Mar. 22, 1999, now U.S. Pat. No. 6,181,352.

BACKGROUND OF THE INVENTION

1. Field of the Invention

This invention relates to computer display systems and, more particularly, to methods and apparatus for providing a graphics accelerator capable of selectively providing during any clock period color values for at least two pixels blended with a single texture or color values for a single pixel blended with a plurality of textures.

2. History of the Prior Art

In three dimensional graphics, surfaces are typically rendered by assembling a plurality of polygons in a desired shape. The polygons are conventionally triangles having vertices which are defined by three dimensional coordinates in world space, by color values, and by texture coordinates.

To display a surface on a computer monitor, the three dimensional world space coordinates are transformed into screen coordinates in which horizontal and vertical values (x, y) define screen position and a depth value (z) determines how near a vertex is to the screen and thus whether that vertex is viewed with respect to other points at the same screen coordinates. The color values (r, g, b) define the brightness of each of red/green/blue colors at each vertex and thus the color (often called diffuse color) at each vertex. Texture coordinates (u, v) define texture map coordinates for each vertex on a particular texture map defined by values stored in memory.

A texture map typically describes a pattern to be applied to the surface of the triangle to vary the color in accordance with the pattern. The texture coordinates of the vertices of a triangular surface area fix the position of the vertices of the triangle on the texture map and thereby determine the texture detail applied to each portion of the surface within the triangle in accordance with the particular texture. In turn, the three dimensional coordinates of the vertices of a triangle positioned on the texture map define the plane in which the texture map and the surface lie with respect to the screen surface.

A texture which is applied to a surface in space may have a wide variety of characteristics. A texture may define a pattern such as a stone wall. It may define light reflected from positions on the surface. It may describe the degree of transparency of a surface and thus how other objects are seen through the surface. A texture may provide characteristics such a dirt and scratches which make a surface appear more realistic. A number of other variations may be provided which fall within the general description of a texture. In theory, a number of different textures may be applied to any triangular surface.

In order to apply more than one texture to a surface, prior art graphics accelerators initially were designed to progress through a series of steps [is] in which pixel coordinates and color values describing each triangle are first generated one pixel at a time in sequence, a first texture is mapped to the triangle using the texture coordinates of the vertices and texture coordinates are generated for each pixel as the pixel coordinates are generated, texture values describing the variation of each pixel in the triangle for the first texture are generated using the texture coordinates for each pixel, the texture value describing the first texture for one pixel and the diffuse color values describing that pixel of the triangle are blended to produce a textured color value for the pixel, and the resulting triangle generated from all of the textured color values is blended with any image residing in a frame buffer from which the image may be presented on an output display. Then, texture values for a second texture mapped to the same triangle are generated and blended with the same sequence of pixel color values in the same manner, and the triangle blended with the second texture is blended with the image residing in the frame buffer.

The need to transit the graphics pipeline to blend each texture to the surface of each triangle defining an output image slows the process drastically. In many cases involving rapidly changing images, it has limited significantly the number of textures which can be applied. For this reason, a more recent development provides a pair of texture stages and a pair of texture blend stages in the pipeline. The first texture stage generates texture values describing a first texture from texture coordinates provided as each pixel is generated. These first texture values are blended with the pixel color values at the first texture blend stage as each set of pixel color values is generated. The textured color value output of the first texture blend stage is then furnished to the second texture blend stage. The textured color value output of the first texture blend stage is blended with texture values generated by the second texture stage using texture coordinates provided as each pixel is generated. The output of the second texture blend stage is ultimately transferred to the frame buffer blend stage to be blended with the image data already in the frame buffer. This more advanced pipeline allows two textures to be blended with a surface in a single pass through the graphics pipeline.

Although this most recent development is useful in accelerating texture blending in a graphics pipeline, it is limited to producing a single pixel having at most two textures during any clock of the graphics pipeline and cannot be utilized for any other purposes. More complicated functions require the use of the host processor and the frame buffer blending stage and drastically slow the rendering of surfaces by the graphics accelerator.

There are no prior art systems which have been capable of providing two or more textured pixels during each clock period.

It is desirable to provide a new computer graphics pipeline capable of rapidly selectively providing a plurality of textured pixels or a single pixel blended with a plurality of textures during any clock period.

SUMMARY OF THE INVENTION

The present invention is realized by a graphics accelerator pipeline including a rasterizer stage, a texture stage, and a combiner stage capable of producing output values during each clock interval of the pipeline which map an individual texture to a plurality of pixels.

These and other features of the invention will be better understood by reference to the detailed description which follows taken together with the drawings in which like elements are referred to by like designations throughout the several views.

DETAILED DESCRIPTION

Figure 1:
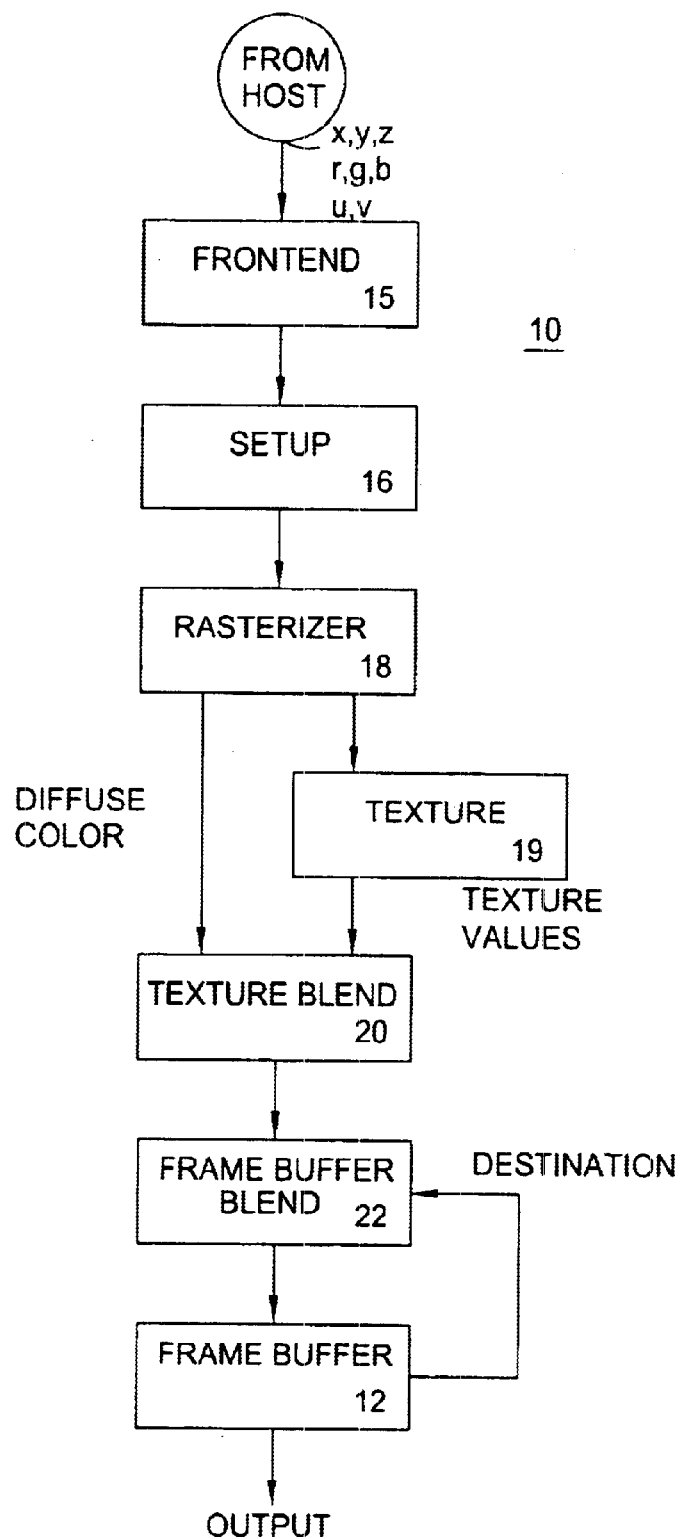
FIG. 1 is a block diagram illustrating a computer graphics pipeline designed in accordance with the teaching of the prior art.

Referring now to FIG. 1, there is illustrated a block diagram of a computer graphics pipeline 10 constructed in accordance with the prior art. The pipeline 10 includes a plurality of stages for rendering pixels defining a three dimensional image to a frame buffer 12 from which the image may be provided at an output stage 13, typically an output display.

The pipeline 10 includes a front end stage 15 at which data positioning each of a plurality of triangles defining an output image is received and decoded. The front end stage 15 receives from an application program the data defining each of the vertices of each triangle which is to appear in the output image being defined in the frame buffer 12. This data may include the three dimensional world coordinates of each of the vertices of each triangle, red/green/blue color values (diffuse color values) at each of the vertices, texture coordinates fixing positions on a texture map for each of the vertices for each texture modifying the color values of each triangle, and various factors for combining the textures and diffuse color values.

The front end stage 15 determines the manner and order in which the pixels of the various triangles will be processed to render the image of the triangle. When this processing order has been determined, the front end stage 15 passes the data defining the vertices of the triangle to a setup stage 16. The setup stage 16 carries out a number of processes known to those skilled in the art that make the operations of generating pixels and applying textures to those pixels progress rapidly. The processes actually carried out by the setup stage 16 may vary depending on the particular implementation of the graphics accelerator. In some circuitry, certain of these processes are implemented by a rasterizer stage 18 and a texture stage 19 which follow the setup stage.

The setup stage 16 utilizes the world space coordinates provided for each triangle to determine the two dimensional coordinates at which those vertices are to appear on the two dimensional screen space of an output display. If the vertices of a triangle are known in screen space, the pixel positions vary linearly along scan lines within the triangle in screen space and may be determined. The setup stage 16 and the rasterizer stage 18 together use the three dimensional world coordinates to determine the position of each pixel defining each of the triangles. Similarly, the diffuse color values of a triangle vary linearly from vertex to vertex in world space. Consequently, setup processes based on linear interpolation of pixel values in screen space, linear interpolation of depth and color values in world space, and perspective transformation between the two spaces will provide pixel coordinates and color values for each pixel of each triangle being described. The end result of this is that the rasterizer stage generates in some sequence screen coordinates and red/green/blue color values (conventionally referred to as diffuse color values) for each pixel describing each triangle.

The setup stage 16 and the rasterizer stage 18 also cooperate in the computation of the texture coordinates for each pixel in each triangle and send those texture coordinates to a texture stage 19. The texture coordinates vary linearly from vertex to vertex in world space. Because of this, texture coordinates at any position throughout the triangle may be determined in world space and related to the pixels to be displayed on the display through processes combining linear interpolation and perspective transformation. The texture coordinates generated are then utilized by the texture stage 19 to index into a selected texture map to determine texels (texture color values at the position defined by the texture coordinates for each pixel) to vary the diffuse color values for the pixel. Often the texture stage 19 interpolates texels at a number of positions surrounding the texture coordinates of a pixel to determine a texture value for the pixel. In one arrangement, texels from four positions surrounding the texture coordinates of the pixel are interpolated to determine a texture value for the pixel. The end result of this is that the texture stage 19 generates in some sequence a texture value for each pixel describing each triangle.

The results provided by the rasterizer and texture stages 18 and 19 are furnished to a texture blend stage 20 in which the diffuse color values generated by the rasterizer for each pixel are blended with the texel value for the pixel in accordance with some combinatorial value often referred to as alpha. Typically, an alpha value is carried as a component of the texture values and determines the amounts of each of the diffuse color values and the texture values to be included in the final color defining that particular pixel. The output of the texture blend stage 20 is a sequence of color values defining the pixels of the particular triangle as blended with a first texture.

Although other stages (not shown) may be included in the pipeline for other effects, the sequence of color values defining the pixels of the particular triangle blended with a first texture generated by the texture blend stage 20 are transferred to a frame buffer blending stage 22. In the frame buffer blending stage, the sequence of color values defining the pixels of the particular triangle blended with a first texture are combined with the pixels already in the frame buffer 12 at the screen position of the triangle in a read/modify/write operation. Then, the color values for the pixels produced by the frame buffer blend stage 22 are stored in the frame buffer 12 replacing the values previously at the pixels positions defining the triangle.

In a prior art graphics pipeline including only one texture stage and only one texture blend stage, only one pixel is produced during any clock interval and only one texture is blended with the diffuse color of the pixel produced. In order to apply an additional texture to the triangle, the pipeline must be traversed a second time. In this second traversal, the rasterizer stage 18 is again utilized to provide the pixels defining the diffuse color output of the triangle and texture coordinates related to a second texture map defining the second texture. The texture coordinates are utilized by the texture stage 19 to produce a second texture value output related to the individual pixels in the triangle. The second set of texture values produced by the texture stage 19 are then blended with the diffuse color values produced by the rasterizer in the texture blending stage 20. Finally, the destination pixel color values in the frame buffer 12 defining the triangle with a first texture are read out of the frame buffer and combined in the frame buffer blend stage 22 with the pixels providing the second texture for the triangle typically utilizing alpha values associated with the second texture values. The result then replaces the destination pixel color values in the frame buffer 22.

As those skilled in the art understand, the time required to overlay the pixels of a triangle with two sets of texture values is very significant. In fact, the time is so great that typically only a single texture is applied to any triangle unless the computer processing the images is very fast or the action of the image is quite slow.

Because of this, more advanced graphics pipelines have been designed. In an advanced graphics pipelines known to the prior art illustrated in FIG. 2, two texture stages 29a and 29b and two texture blend stages 30a and 30b are utilized. In such a pipeline arrangement, each texture stage 29a and 29b receives texture coordinates and generates texture values for a distinct one of two textures which are to be blended with the pixels of the triangle being generated sequentially by the rasterizer stage 18. Thus, as individual diffuse colors are produced by the rasterizer stage 38 to serially describe the pixels of a triangle, a texture value may be produced by each of the texture stages 29a and 29b to be blended with the pixel color values.

As each set of color values of each sequential pixel defining the particular triangle is generated, it is blended in the first texture blend stage 30a with texture values defining a first texture for that pixel furnished by the first texture stage 29a. Each set of textured color values resulting from the blending is transferred as it is generated to the second texture blend stage 30b and blended with the second sequence of texture values produced by the second texture stage 29b. The color values resulting from blending diffuse color values with one or two textures are ultimately transferred to a frame buffer blending stage 22 from the second texture blend stage 30b and combined with the pixels already in the frame buffer 12 at the screen position of the triangle in a read/modify/write operation. The color values for the pixels produced by the frame buffer blend stage 21 are stored in the frame buffer 12 replacing the values previously at the pixels positions defining the triangle.

Figure 2:
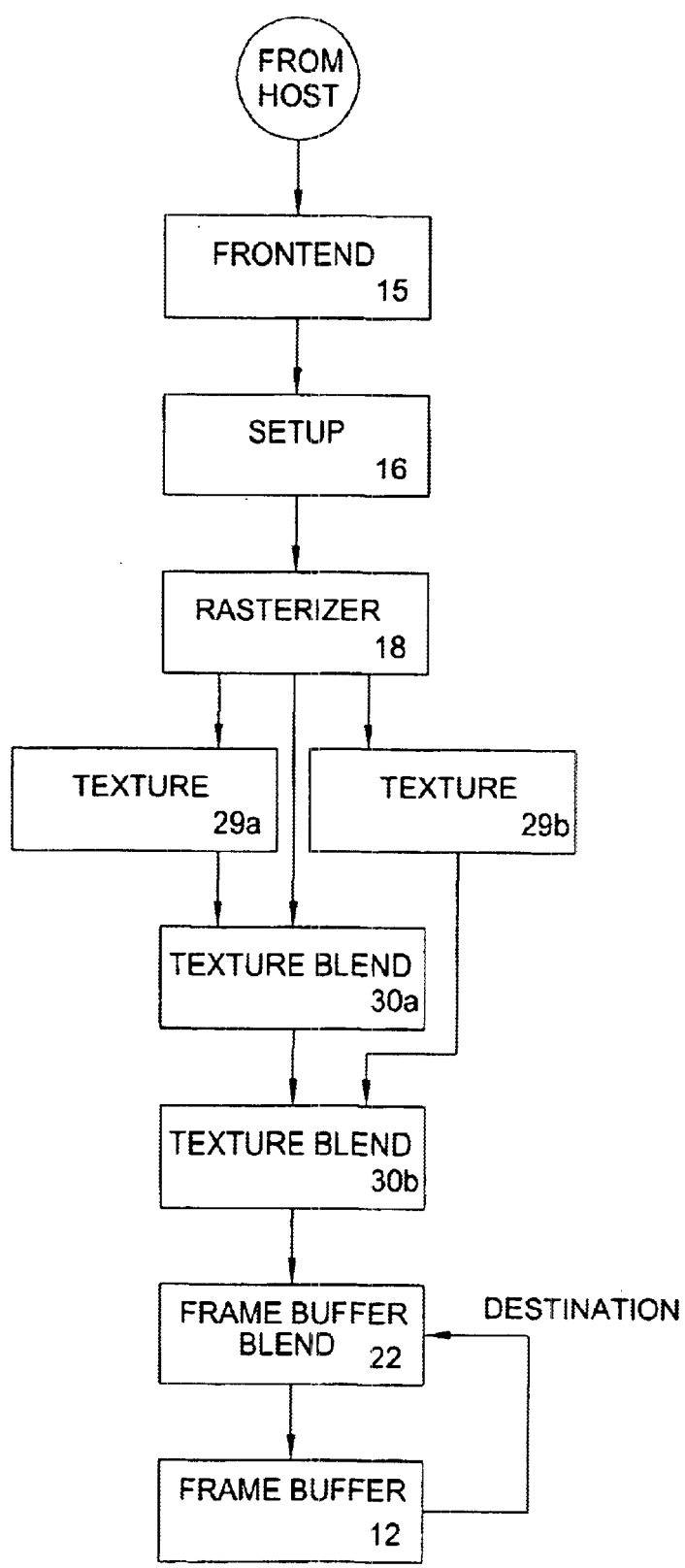
FIG. 2 is a block diagram illustrating another computer graphics pipeline designed in accordance with the teaching of the prior art.

Although the advanced prior art pipeline illustrated in FIG. 2 is capable of producing a stream of color values for pixels one pixel at a time defining a surface blended with two textures during a single pass through the pipeline, this is all that the pipeline is able to accomplish.

It is desirable to provide a graphics accelerator which is capable of both (1) producing a sequence of pixels each combined with one or more textures during each clock interval, and (2) producing more than one pixel blended with a texture during each clock interval.

The present invention provides a graphics pipeline that fulfills these requirements. To accomplish this, the present invention provides a new graphics pipeline including unique processing stages. These new processing stages allow a plurality of pixels each modified by the same texture to be produced during any clock interval of the pipeline thereby significantly accelerating the rendering of graphics images. The processing stages also allow texture values for a plurality of different textures to be processed simultaneously through the graphics pipeline and applied to a stream of single pixels. Thus, the new pipeline is faster and much more flexible than are prior art graphics pipelines.

Figure 3:
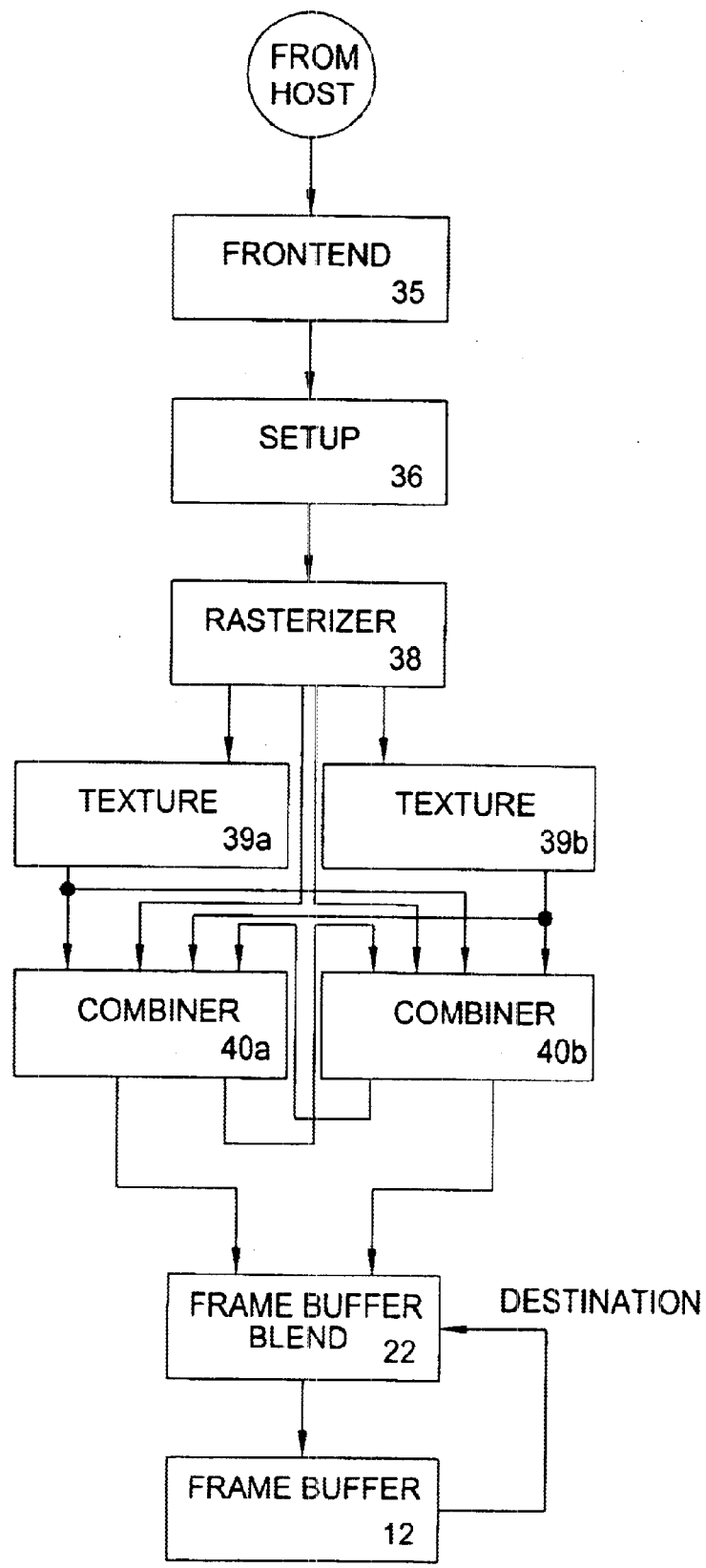
FIG. 3 is a block diagram illustrating a computer graphics pipeline designed in accordance with the present invention.

FIG. 3 is a block diagram illustrating components of a new graphics pipeline in accordance with the present invention. The new graphics pipeline includes front end, setup, and rasterizer stages 35, 36, and 38 which accomplish the functions described in detail above with respect to similar stages illustrated in FIG. 1. In addition to the usual functions accomplished by rasterizers of the prior art, the rasterizer 38 is designed to provide pixel coordinates and color values for two adjacent pixels and texture coordinates for each of the two pixels during the same clock interval. This may be accomplished in one embodiment by furnishing output values which include not only the normal X value in screen coordinates, but an X+1 value as well. Alternatively, output values including Y and Y+1 values might be furnished. The pipeline includes a pair of texture stages 39a and 39b each of which is adapted to produce texture values in the manner described in detail above for individual textures being applied to a surface. In other embodiments, additional texture stages may be incorporated into the pipeline in the manner described herein.

Figure 4:
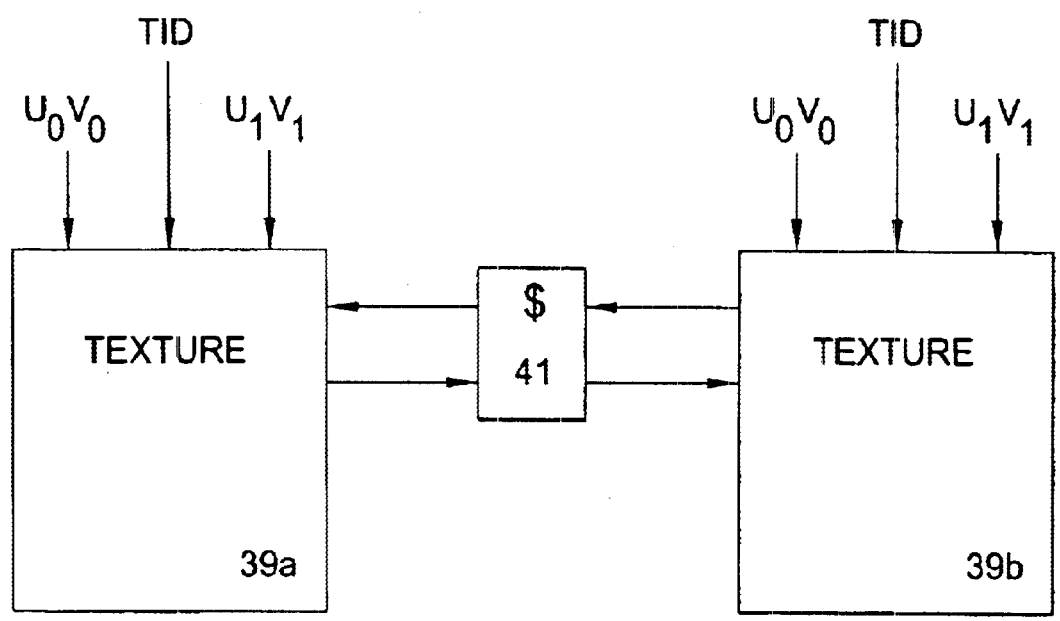
FIG. 4 is a block diagram illustrating in detail a portion of the computer graphics pipeline of FIG. 3.

FIG. 4 illustrates one embodiment of a texture stage 39a or 39b. Each texture stage 39a and 39b is adapted to receive input signals which include texture coordinates for each of the two pixels of a triangle being rendered as the individual pixel coordinates are simultaneously generated by the rasterizer stage 38. The texture stages also receive a texture identification (id) value indicating a texture to be mapped to the triangle. The texture identification sent to each of the texture stages may be the same or different.

Each texture stage is capable of selecting one set of texture coordinates furnished to generate a texture value using the texture map identified for one set of pixel coordinates. The texture coordinates may be those for either the first or the second of the two texture coordinates furnished after computation by the rasterizer. In one arrangement, the texture stage uses the typically non-integer set of texture coordinates to determine a set of four integer texture coordinates surrounding the texture coordinate provided and retrieves texels at each of the integer positions from a cache 41 storing texels of the identified texture map. A detailed description of a texture cache arrangement capable of providing such texels to a texture stage is provided in U.S. patent application Ser. No. 09/273,827, entitled *Texture Caching Arrangement For A Computer Graphics Accelerator*, by G. Solanki et al, filed on even date herewith and assigned to the assignee of the present invention.

The texture stage blends the four texels obtained from the cache 41 and provides a texture value output for the set of texture coordinates utilized. Thus, the outputs produced by the two texture stages 39a and 39b are two sequences of texture values defining two textures to be mapped to the triangle the pixels for which are simultaneously being furnished by the rasterizer stage 28.

Since the rasterizer stage 38 produces a pair of adjacent pixels at each clock interval of the pipeline and furnishes a pair of texture coordinates for these pixels to each of the texture stages 39a and 39b, a number of possible output sequences may be selectably produced by the texture stages.

If an application program desires to apply two different textures to each pixel of a sequence of pixels produced by the rasterizer 38, then each texture stage receives a different texture map identification as an input value so that the coordinates furnished are used with a different texture map. Moreover, in order to apply two textures to each individual pixel of the sequence being generated, each individual texture stage is furnished the unique texture coordinates for the individual texture to be applied by that texture stage to that pixel. This causes the two texture stages 39a and 39b to generate sequences of texture values from two texture maps which may be blended in a single pass through the pipeline to the sequence of pixels being generated in the manner described with respect to FIG. 2.

On the other hand, if an application program desires to produce two sequential pixels having the same texture during any clock interval of the pipeline, then each texture stage receives the same texture map identification as an input value so that the coordinates furnished are used with the same texture map. However, in order to apply a single textures to each of two simultaneously generated pixels of the sequence being generated, one of the texture stages is furnished the unique texture coordinates for the first of the individual pixels, while the other texture stage is furnished the unique texture coordinates for the second of the individual pixels. This causes the two texture stages 39a and 39b to generate sequences of texture values from a single texture map each of which may be blended with the diffuse colors of one of the pair of pixels generated by the rasterizer 38 in a single pass through the pipeline in the manner described with respect to FIG. 2.

In addition to the multiple texture stages 39a and 39b, the pipeline of the present invention shown in FIG. 3 also includes two combiner stages 40a and 40b and does not include the texture blend stage or stages of the prior art. The combiner stages 40a and 40b each are capable of receiving input from a plurality of possible sources. For example, the combiner stages may each utilize as input, among other values, the output texture values produced by either of the texture stages 39a or 39b, the diffuse color output of the rasterizer stage 38, the output of the other combiner stage, and input signals defining various factors useful in combining various textures and colors together. A detailed description of a graphics pipeline including combiner stages is provided in U.S. patent application Ser. No. 09/273,975, entitled *Graphics Pipeline Including Combiner Stages,* by D. Kirk et al, filed on even date herewith and assigned to the assignee of the present invention.

Figure 5:
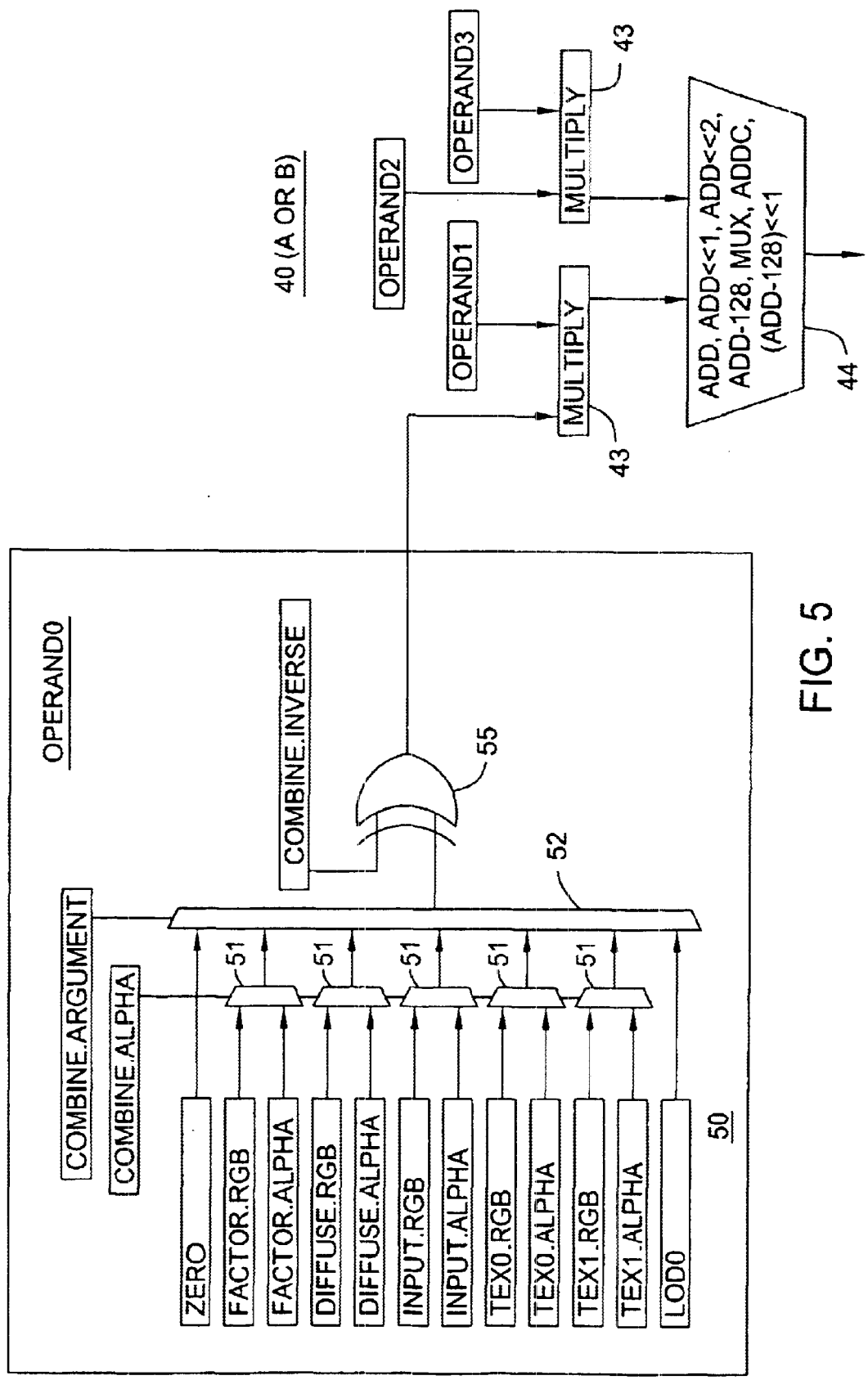
FIG. 5 is block diagram illustrating in more detail another portion of the computer graphics pipeline of FIG. 3.

The combiner stages allow the diffuse color image furnished by the rasterizer stage 38 to be combined with each of at least two individual textures during the same pass through the pipeline. These stages also allow a plurality of other functions to be accomplished which greatly accelerate the operation of the pipeline. FIG. 5 is a block diagram describing the general form of the combiners 40a and 40b which should help to better illustrate their facilities. As FIG. 5 illustrates, each of the combiners includes a pair of multiply circuits 43 the output from each of which provides input to an add circuit 44. Each of the multiply circuits 43 is organized to multiply two input operands together and furnish the result as output. In contrast to prior art circuits which allow the blending of at most two textures and a single set of diffuse color pixels, the two input operands of each of the two multiply circuits may each be selected from any of a number of different sources among which are those described in the figure. This allows combinations to be accomplish in a single pass through the pipeline which could not be accomplished in any realistic manner by prior art circuitry. The add circuit 44 adds the results of the two multiplications accomplished by the multiply circuits 43 and accomplishes certain other operations. Any of the available operands may be selected to be multiplied by another and the result of this multiplication added to the result of another multiplication of two selectable operands. In contrast to prior art circuits in which a texture blend stage allows the blending of a texture and a single set of diffuse color pixels, the two input operands of each of the two multiply circuits may each be selected from any of a number of different sources among which are those described above. This allows operations to be accomplish in a single pass through the pipeline which could not be accomplished in any realistic manner by prior art circuitry.

As those skilled in the art will recognize, the typical operation by which a texture is mapped to a triangle utilizes a factor for selecting the amount of each diffuse pixel color to combine with the texture value color for that pixel. Typically, the factor is included with the texture information as an alpha value between zero and one. One of the two elements to be combined is multiplied by the alpha value while the other is multiplied by one minus the alpha value. When these are added together, the result is the color value of the textured pixel. This assures that each color will be made up of some percentage of diffuse color and a remaining percentage of a modifying texture color as determined by the alpha (or other factor).

As may be seen, the combiners 40a and 40b are each adapted to easily handle the blending of textures with diffuse images in this manner. If the diffuse color pixels defining the triangle and an alpha value provided with the texture information are furnished as the two operands to one of the multipliers 43, the result is the diffuse pixel color multiplied by the alpha value. Similarly, if the texture values related to each of those pixels and one minus the alpha value are furnished as operands to the other of the two multipliers 43, the result is the texture value for each pixel multiplied by one minus alpha. Then the result may be added by the add circuit 44 to map the texture to the pixels of the triangle.

The two combiner stages are adapted to provide two individual streams of pixels combined with samples from the same texture and thereby provide an output at a rate of two pixels per clock interval of the pipeline. In one embodiment, this is accomplished by sending color values generated by the rasterizer 38 for alternate pixels to the two combiners. For example, each first pixel generated may be sent to the combiner 40a and each second pixel generated sent to combiner 40b. Then, each pixel color value is combined with a set of texture values produced by one of the texture stages 39 selected to provide texture values at the correct pixel positions.

Thus, the control circuitry may be utilized to provide diffuse color values of separate pixels to the first and second combiners. In one case, the diffuse color values of sequential pixels may be provided as input values to the first and second combiners. Simultaneously, texture values for these sequential pixels derived from a single texture map may be provided as input values to the first and second combiners to be blended with the diffuse color values of the two sequential pixels. This allows each combiner to blend the same texture with sequential pixels in the same clock interval. This operation produces pixels twice as fast as prior art arrangements.

On the other hand, the diffuse pixel colors for each pixel in the sequence may be provided to the same combiner 40a. At the same time, the texture values provided to the first and second combiners to be blended with the diffuse color values of the single pixel may differ in accordance with two different texture maps. The combiner 40a then blends a first texture with the stream of pixel color values and send the resulting stream of textured color values to the second combiner 40b to be combined with a second different texture in the same clock interval.

FIG. 5 illustrates in detail an embodiment of an input stage 50 for one combiner. The input stage includes a plurality of multiplexors 51 each receiving input from two sources and furnishing output to another multiplexor 52. One of the multiplexors 51 receives diffuse color values (DIFFUSE.RGB) and a diffuse alpha value (DIFFUSE.ALPHA), another multiplexor 51 receives first texture values (TEX0.RGB) and first texture alpha values (TEX0.ALPHA), and a third multiplexor 51 receives second texture values (TEX1.RGB) and second texture alpha values (TEX1.ALPHA). These operands are used in the manner discussed above. In addition, another multiplexor 51 receives factor values (FACTOR.RGB) and factor alpha values (FACTOR.ALPHA), and a final multiplexor 51 receives input values (INPUT.RGB) and input alpha values (INPUT.ALPHA). It should be understood that where the block diagram illustrates an input which is a color value such as diffuse color or a texture, the circuitry of the multiplexors is actually designed as three essentially identical circuits each designed to process one of the three individual red, green, and blue components of the color value separately. Moreover, as will be discussed later, a fourth circuit arrangement is also provided for accomplishing similar combinations of the alpha values which may be carried with each of the diffuse color values, texture values, factor values, and input values shown.

A COMBINE.ALPHA control signal controls the selection of the particular output furnished by each multiplexor 51 as input to the multiplexor 52. This COMBINE.ALPHA control signal selects for each multiplexor either the values themselves (those identified by .RGB) or the alpha values associated with the values (those identified by .ALPHA) as the input values to be furnished to the multiplexor 52 to be combined by one of the multipliers 43. Thus, the color values provided by the diffuse color input, the texture inputs, the factor value, and the undesignated input may be selected by the multiplexors 51. Alternatively, the plurality of alpha values associated with diffuse color, the different textures, the factor value, and the input value may be chosen.

It should be noted that a constant factor may be used in a computation to determine the weight to be given a diffuse color or a texture, in order to change its brightness, for example. The INPUT.RGB and INPUT.ALPHA values provide an additional undetermined input which a programmer may assign to any of a number of available sources. One manner in which this input may be used is to allow the result produced by one of the combiners to be used as a source for the other combiner.

The values selected by the multiplexors 51 are transferred to the multiplexor 52. In addition to the values selected by the multiplexors 51, the multiplexor 52 also receives individual input signals ZERO and LOD0. It should be noted that by selecting ZERO, one of the operands of a multiplication will be zero; thus, one result may be effectively eliminated as an input to the adder thereby allowing the adder to provide the sum of two multiplications or the result of either of the individual multiplications. On the other hand, by selecting LOD0, a particular level of detail is selected; the level of detail effectively causes a blend of texture values furnished as another input operand to the particular multiplier 43. Any of these values may be selected by the multiplexor 52 for multiplication by another input operand. Thus, one of the alpha values, one of the many color values, ZERO, or LOD0 may be selected as an operand by the multiplexor 52.

The operands provided by the multiplexor 52 are selected in the manner determined by a COMBINE.ARGUMENT control signal which designates the particular multiplicand to be selected. Thus any of the color values, the alpha values, a factor, a level of detail, or zero may be transferred as an operand to a multiplier.

It should be noted that, as a generality, the arrangement provided is adapted to provide as an operand to one of the multipliers, either some form of color value or an alpha value. Thus, the arrangement is especially adapted to furnish one set of three operands by means of the three individual circuits providing operands for the multipliers which are the r,g,b color values and another set of three operands which are the alpha values by which these color values are to be blended. This allows one multiplier to produce an output with any set of color values which is the red color value multiplied by its alpha, the green color value multiplied by its alpha, and the blue color value multiplied by its alpha. These are the usual components of blending operations.

The result furnished by each multiplexor 52 at the input to each multiplier 43 may be inverted by an inverter 55 in response to a control signal COMBINE.INVERSE. In addition to other advantages, this allows a binary number result to be produced which is one minus the particular value, a result which is especially useful in providing the one minus alpha multiplier for color values and is used in other interpolation operations.

The outputs of two input stages 50 are transferred as operands to a multiplier 43. The multiplier 43 multiplies the two values together. This allows any of the operands to be multiplied by another. For example, any of the color operands such as diffuse color or a texture value may be multiplied by alpha, an inverted alpha value (one minus alpha), a constant factor, a level of detail, or some other input to provide an output value. The results produced by the two multipliers 43 are transferred to the adder 44.

The operations of adder 44 utilized with a particular embodiment are illustrated (within element 44) in FIG. 5. The adder has as a basic function the addition of the two multiplied results provided to it. Thus, if a diffuse color value and an alpha value are furnished to one multiplier, a texture value and inverse alpha to the other multiplier, the result produced by the adder 44 through a simple addition can be the color value for a pixel in which diffuse color is blended with the texture in accordance with the alpha value. This produces the pixel modified by the desired texture. It should be noted that any of the alpha values provided by any of the diffuse color or texture values may be used in the operation.

The adder in this embodiment is also adapted to provide a number of other output results which the graphics pipelines of the prior art have not been capable of producing efficiently. For example, the adder may be used as a simple multiplexor to select from among the two input values provided. This allows the output from the combiner to be either the result of the addition of the two multiplications or either of the individual results of the multiplications. In addition, the adder allows the output produced to be shifted one or two bits to the left or one bit to the right. This allows the result to be doubled, quadrupled, or halved. These results are especially useful in modifying the intensity of pixels in the output result and in maintaining precision of binary calculations. A value of 128 may be subtracted from the results allowing the transfer between signed values and unsigned values thereby allowing the use of applications utilizing both signed and unsigned numbers. In the particular embodiment, a result from which 128 has been subtracted may also be shifted by one bit.

The combination of the selectable operands, the plurality of functions provided by the adder 44, and the ability to use the result of one combiner operation as input to the other allows the different input values to be manipulated to provide a myriad of different output values. Not only may the combiners may be utilized to blend a texture and a diffuse image and then to blend the result and a second texture, the combiners may be utilized to accomplish very complicated operations which typically require significantly more hardware and processing time in prior art circuits when those operations are possible at all.

For example, the factor input allows two textures to be combined with one another each as some percentage of a whole. By selecting the LOD input and a texture, a texture value may be multiplied by a value to provide the equivalent of a particular level of detail. The same texture value and a different LOD value as operands for the other multiplier provide a second level of detail. These may be combined by the adder. Any number of other operations typical to graphics accelerators may be accomplished rapidly through use of the combiners. Moreover, each of these operations may typically be accomplished in a single pass through the graphics pipeline of the invention.

In addition to the three r,g,b processing paths for handling the color and texture values discussed with respect to FIG. 5, each of the combiners also includes a fourth path which is quite similar to each of the color paths. However, rather than allowing color and alpha values both to be used as operands, this path is designed to manipulate only the various alpha values. This path includes in one embodiment a pair of multipliers each capable of utilizing as operands all of the alpha value inputs which are available to the circuit of FIG. 5 as well as the LOD0 value and zero. The inverse of any of these values is also available as an operand. The operands are multiplied by the multipliers and the results furnished as output signals to an adder. The arrangement allows the alpha values to be separately manipulated is the manner described previously where that is a desirable operation. For example, this may be useful in providing a value to be used in furnishing specular lighting attributes. These attributes typically appear as white or colored highlight reflections from an image; the retention of a white value in a final image requires a different combination than the usual texture combination.

As will be understood, if more than two textures are to be mapped, then an embodiment having additional texture stages and combiners may be utilized.

It should also be noted that a pipeline utilizing a single combiner stage may be used to accomplish the same functions since the output of the stage may be routed as input so that multiple textures may be blended to each pixel.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A graphics accelerator pipeline comprising:

a rasterizer stage configured to generate pixel coordinates and color values for each of at least two pixels during each clock interval of the pipeline in response to data indicative of a single polygonal primitive, a texture stage configured to generate texture values for selectable textures, and a combiner stage configured to produce output values for a plurality of textured pixels during each clock interval of the pipeline, said combiner stage having at least a first operating mode in which at least one of the output values is a single output pixel value indicative of blends of texels from at least two different textures and a second operating mode in which at least two different ones of the output values are indicative of texels from a single texture.

2. A graphics accelerator pipeline comprising:

a rasterizer stage for generating pixel coordinates, texture coordinates, color values, and combining factors for each of at least two pixels during each clock interval of the pipeline in response to data indicative of a single polygonal primitive;

a plurality of texture stages configured to respond to the texture coordinates to provide texture values from selectable texture maps; and means for selectively combining the texture values and the color values using the combining factors to define output values for each of at least two textured pixels during each clock interval of the pipeline, said means for selectively combining having at least a first operating mode in which at least one of the output values is a single output pixel value indicative of blends of texels from at least two different textures and a second operating mode in which at least two different ones of the output values are indicative of texels from a single texture.

3. A method for pipelined generation of output values for a sequence of pixels using a graphics accelerator apparatus, wherein the graphics accelerator apparatus operates in response to a clock signal and has a combiner stage, said method comprising the steps of:

(a) generating pixel coordinates, texture coordinates, and color values for each pixel of a pixel set during a first clock interval of the clock signal, wherein the pixel set includes at least one pixel;

(b) generating texture values during a second clock interval of the clock signal in response to the texture coordinates, wherein the texture values include at least a first texture value and a second texture value, the second clock interval is a single clock interval of the clock signal subsequent to the first clock interval, the first texture value is determined by a first texture map and the second texture value is determined by a second texture map when the texture coordinates are indicative of said first texture map and said second texture map, and both the first texture value and the second texture value are determined by the first texture map when the texture coordinates are indicative of said first texture map but not said second texture map; and (c) in response to the pixel coordinates, the color values, the texture values, and control bits, operating the combiner stage to generate the output values for said each pixel of the pixel set during a third clock interval of the clock signal, wherein the third clock interval is a single clock interval of the clock signal subsequent to the second clock interval, wherein the output values are indicative of blends of each of at least two different textures with a single pixel when the control bits trigger a first operating mode of the combiner stage, and at least two different ones of the output values are indicative of texels from a single texture when the control bits trigger a second operating mode of the combiner stage.

* * * * *